United States Patent
Zhao et al.

(10) Patent No.: US 9,589,563 B2
(45) Date of Patent: Mar. 7, 2017

(54) SPEECH RECOGNITION OF PARTIAL PROPER NAMES BY NATURAL LANGUAGE PROCESSING

(71) Applicant: Robert Bosch GmbH, Stuttgart (DE)

(72) Inventors: Lin Zhao, Sunnyvale, CA (US); Zhe Feng, Mountain View, CA (US); Kui Xu, Sunnyvale, CA (US); Fuliang Weng, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/728,118

(22) Filed: Jun. 2, 2015

(65) Prior Publication Data
US 2015/0348543 A1   Dec. 3, 2015

Related U.S. Application Data

(60) Provisional application No. 62/006,496, filed on Jun. 2, 2014.

(51) Int. Cl.
| | |
|---|---|
| *G06F 17/27* | (2006.01) |
| *G10L 15/18* | (2013.01) |
| *G06F 17/20* | (2006.01) |
| *G10L 15/02* | (2006.01) |
| *G10L 15/26* | (2006.01) |
| *G10L 15/19* | (2013.01) |

(52) U.S. Cl.
CPC .................................. *G10L 15/19* (2013.01)

(58) Field of Classification Search
CPC ......... G06F 17/27; G06F 17/20; G10L 15/18; G10L 15/02; G10L 15/26

USPC .... 704/9, 256.5, 257, 4, 201, 231, 235, 240, 704/251, 254
See application file for complete search history.

(56) References Cited

U.S. PATENT DOCUMENTS

| | | | |
|---|---|---|---|
| 5,797,123 A | * | 8/1998 | Chou ..................... G10L 15/18 704/240 |
| 6,694,055 B2 | | 2/2004 | Wu |
| 7,136,806 B2 | | 11/2006 | Miyahira et al. |

(Continued)

OTHER PUBLICATIONS

Collobert et al., "Natural language processing (almost) from scratch."The Journal of Machine Learning Research 12 (2011): 2493-2537.*

(Continued)

*Primary Examiner* — Pierre-Louis Desir
*Assistant Examiner* — Seong Ah A Shin
(74) *Attorney, Agent, or Firm* — Maginot Moore & Beck LLP

(57) ABSTRACT

A method for speech recognition of partial proper names is described which includes natural language processing (NLP), partial name candidate generation, speech recognition and post processing. Natural language processing techniques including shallow and deep parsing are applied to long proper names to identify syntactic units (for example, noun phrases). The syntactic units form a basis for generating a candidate list of partial names for each original full name. A partial name is part of the original name, with some words omitted, or word order changed, or even word substitution. After candidate partial names are generated, their phonetic transcriptions are incorporated into a model for a speech recognizer to recognize the partial names in a speech recognition system.

16 Claims, 3 Drawing Sheets

(56) References Cited

U.S. PATENT DOCUMENTS

| | | | |
|---|---|---|---|
| 7,272,558 B1* | 9/2007 | Soucy | G06F 17/30746 704/235 |
| 7,475,010 B2 | 1/2009 | Chao | |
| 7,725,408 B2 | 5/2010 | Lee et al. | |
| 7,925,507 B2 | 4/2011 | Weng et al. | |
| 8,374,871 B2 | 2/2013 | Ehsani et al. | |
| 8,442,812 B2 | 5/2013 | Ehsani et al. | |
| 8,594,996 B2 | 11/2013 | Liang et al. | |
| 8,595,245 B2 | 11/2013 | Cavestro et al. | |
| 8,886,518 B1* | 11/2014 | Wang | G06F 17/2818 704/1 |
| 2003/0191625 A1* | 10/2003 | Gorin | G06F 17/278 704/1 |
| 2004/0153306 A1* | 8/2004 | Tanner | G06F 17/273 704/4 |
| 2006/0245641 A1* | 11/2006 | Viola | G06F 17/2715 382/155 |
| 2007/0100624 A1 | 5/2007 | Weng et al. | |
| 2007/0100814 A1* | 5/2007 | Lee | G06F 17/278 |
| 2008/0059186 A1* | 3/2008 | Mowatt | G10L 15/193 704/257 |
| 2009/0055183 A1* | 2/2009 | Yakhnenko | G10L 15/142 704/256.5 |
| 2011/0119049 A1 | 5/2011 | Ylonen | |
| 2011/0173000 A1* | 7/2011 | Yamamoto | G10L 15/1815 704/240 |
| 2012/0303358 A1 | 11/2012 | Ducatel et al. | |
| 2012/0330648 A1* | 12/2012 | Boguraev | G06F 17/2735 704/9 |
| 2012/0330932 A1 | 12/2012 | Boyd et al. | |
| 2013/0124964 A1 | 5/2013 | Viegas et al. | |
| 2013/0325453 A1* | 12/2013 | Levien | G10L 21/00 704/201 |
| 2014/0195226 A1* | 7/2014 | Yun | G10L 15/01 704/231 |
| 2014/0358544 A1* | 12/2014 | Printz | G10L 15/19 704/254 |
| 2015/0371632 A1* | 12/2015 | Skobeltsyn | G10L 15/187 704/251 |
| 2016/0189710 A1* | 6/2016 | Hong | G10L 15/22 704/235 |

OTHER PUBLICATIONS

Carlson et al., "Toward an Architecture for Never-Ending Language Learning." AAAI. vol. 5. 2010.*

McCallum, "Efficiently inducing features of conditional random fields." Proceedings of the Nineteenth conference on Uncertainty in Artificial Intelligence. Morgan Kaufmann Publishers Inc., 2002.*

Wacholder, Nina et al., "Disambiguation of Proper Names in Text", Proceedings from the Fifth Conference on Applied Natural Language Processing, 1997.

Bengfort, Benjamin, "An Introduction to Named Entity Recognition in Natural Language Processing—Part 1", http://www.datacommunitydc.org/blog/2013/04/a-survey-of-stochastic-and-gazetteer-based-approaches-for-named-entity-recognition, Apr. 17, 2013.

Funayama, Hirotaka et al., "Bottom-up Named Entity Recognition using a Two-stage Machine Learning Method", Proceedings of the 2009 Workshop on Multiword Expressions, ACL-IJCNLP 2009, pp. 55-62.

Krishnan, Vijay et al., "An Effective Two-Stage Model for Exploiting Non-Local Dependencies in Named Entity Recognition", Proceedings of the 21st International Conference on Computational Linguistics and 44th Annual Meeting of the ACL, pp. 1121-1128.

Ratinov, Lev et al., "Design Challenges and Misconceptions in Named Entity Recognition", Proceedings of the Thirteenth Conference on Computational Natural Language Learning (CoNLL), pp. 147-155.

VoCon Hybrid Speech Recognition, 2013 Nuance Communications.

Zhou, Guodong et al., "Named Entity Recognition using an HMM-based Chunk Tagger", Proceedings of the 40th Annual Meeting of the Association for Computational Linguistics (ACL), Jul. 2002, pp. 473-480.

* cited by examiner

SPEECH RECOGNITION OF PARTIAL PROPER NAMES BY NATURAL LANGUAGE PROCESSING

CLAIM OF PRIORITY

This application claims priority to U.S. Provisional Patent Application No. 62/006,496, which is entitled "Speech Recognition of Partial Proper Names by Natural Language Processing," and was filed on Jun. 2, 2014, the entire contents of which are hereby expressly incorporated by reference herein.

FIELD

This disclosure relates generally to the fields of speech recognition and, more particularly, to systems and methods for recognizing partial proper names using natural language processing.

BACKGROUND

In the field of speech recognition, the recognition of dynamic slot values, which include proper names such as personal names, street names, restaurant names, etc., is a key problem, as the recognizers rely on the accurate recognition of proper names to understand the intentions for the users. In some domains, such as the media or audio domain, the proper names could be very long, for example, a song name, an audio book name or a movie name. In such cases, people do not always use the full proper names. Partial names may be used to refer to their corresponding entities when the names are long. In spoken dialog applications, partial names tend to be used instead of the full names. At least one empirical user study shows that at least 25% of proper names are partial names. For example, a user might say "play the song 'one last dance'" instead of using the full song name "play the song 'Just One Last Dance'". While in the user's private song database (e.g. the USB or MP3 from the user) or the public song database, only full names are stored. In such situation, only the transcriptions of the full names are available and incorporated into the speech recognizer.

If the user says some partial name as in the example, the recognizer cannot recognize it correctly because it does not have the information of partial proper names. On the other hand, if the user is required to speak only the full name, it is less natural and will have negative impact on the user experience. Therefore, how to correctly recognize these partial names is an important topic. Compared to the recognition of full names, little attention has been put on the recognition of partial names. Consequently, systems and methods for improving the recognition of partial names in speech recognition systems would be beneficial.

SUMMARY

A speech recognition framework enables recognition of partial proper names in spoken dialog applications. The framework uses NLP technologies to analyze the internal structure of the proper names and generate the partial candidates for the names, especially those in some specific domains. By incorporating NLP technologies, the framework generates natural candidates which are more consistent with the user behavior, so that the system can achieve higher coverage and better performance on speech recognition.

In one embodiment, the framework performs a method for speech recognition of partial proper names. The method includes receiving with a processor a corpus including a plurality of complex proper names, performing with the processor natural language processing to generate candidate partial names from the plurality of complex names in the corpus, incorporating with the processor the plurality of candidate partial names into a speech recognizer for recognizing the partial names in a speech recognition process, and storing the plurality of candidate names in association with the complex proper names for identification of the complex proper names in a speech recognition process after recognizing the partial names.

In another embodiment, a method for producing a model for speech recognition of complex proper names in response to speech input including partial proper names has been developed. The method includes receiving with a processor a corpus including a plurality of complex proper names, performing with the processor natural language processing to generate syntactic structure corresponding to a plurality of words in one complex proper name in the corpus, generating with the processor a plurality of candidate partial names corresponding to the one complex proper name using a machine learning process with reference to the syntactic structure corresponding to the one complex proper name and the plurality of words in the one complex proper name, incorporating with the processor the plurality of candidate partial names into a model for a speech recognizer to recognize partial names in a speech recognition process, and storing with the processor the model for the speech recognizer in a memory for identification of the complex proper names in a speech recognition process after recognizing the partial names.

In another embodiment, a speech recognition system that identifies complex proper names from speech inputs including partial proper names has been developed. The system includes a memory and a processor operatively connected to the memory. The memory is configured to store a corpus including a plurality of complex proper names and a model for a speech recognizer. The processor is configured to perform natural language processing to generate syntactic structure corresponding to a plurality of words in one complex proper name in the corpus, generate a plurality of candidate partial names corresponding to the one complex proper name using a machine learning process with reference to the syntactic structure corresponding to the one complex proper name and the plurality of words in the one complex proper name, incorporate the plurality of candidate partial names into the model for the speech recognizer to recognize partial names in a speech recognition process, and store the model for the speech recognizer in the memory for identification of the complex proper names in a speech recognition process after recognizing the partial names.

DETAILED DESCRIPTION

For the purposes of promoting an understanding of the principles of the embodiments disclosed herein, reference is now be made to the drawings and descriptions in the following written specification. No limitation to the scope of the subject matter is intended by the references. The present disclosure also includes any alterations and modifications to the illustrated embodiments and includes further applications of the principles of the disclosed embodiments as would normally occur to one skilled in the art to which this disclosure pertains.

The term "complex proper name" refers to a proper name that includes multiple words in one or more phrases. For example, "Dr. Strangelove or: How I Learned to Stop Worrying and Love the Bomb" is an example of a complex proper name referring to the title of a movie. The term "partial proper name" refers to a simplification of a complex proper name that is commonly associated with a longer complex proper name and is often used in conversation by humans.

Figure 1:
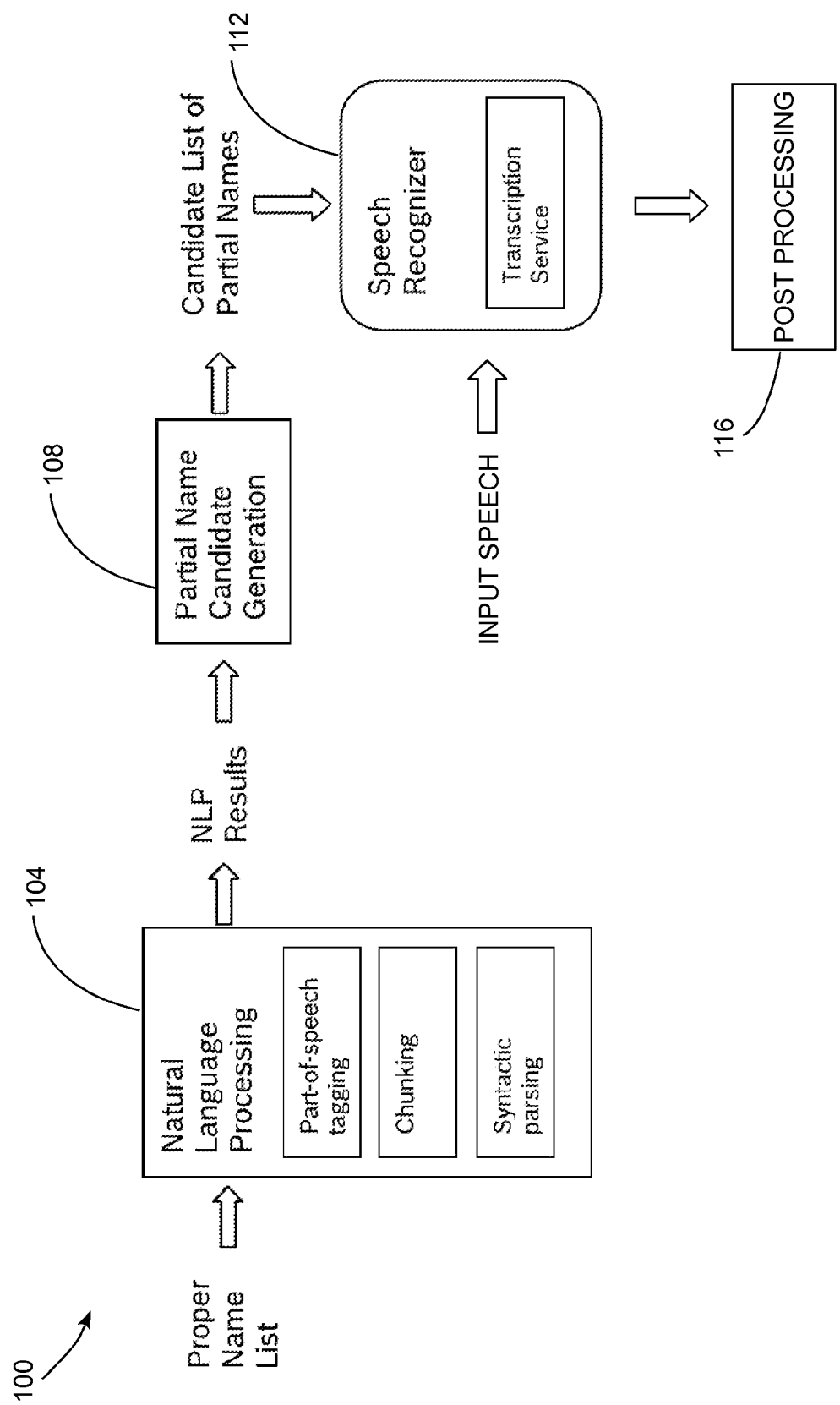
FIG. 1 is a diagram of a framework for generating an enriched speech recognizer with partial proper names identified from complex proper names.

FIG. 1 depicts a speech recognition system 100 and process for using natural language processing (NLP) to generate candidate partial names for complex proper names and use the partial names to enrich the speech recognizer for recognizing the partial names. The system 100 includes an NLP module 104, a partial name candidate generation module 108, a speech recognizer module 112, and a post-processing module 116. During operation, the system 100 performs training processes to produce statistical models to improve that robustness of partial proper name recognition and the system 100 performs speech recognition using the statistical models to identify full proper names based on the speech input from users who utter partial proper names.

The system 100 depicted in FIG. 1 is typically performed using a computing device with at least one digital processor. The processor implements the NLP module 104, partial name candidate generation module 108, a speech recognizer module 112, and post-processing module 116 using one or more software and digital processing hardware elements. The processor receives a corpus including a plurality of complex proper names, performs natural language processing to generate candidate partial names from the plurality of complex names in the corpus, and incorporates the candidate partial names into a statistical model for a speech recognizer using a transcription service.

The system 100 of FIG. 1 uses natural language processing (NLP) techniques for the recognition of complex proper names based on speech inputs that only include portions of the complex proper names. The system uses NLP techniques in the module 104 to process a list of complex proper names and generate syntactic structure for the words that are present in the complex proper names. As used herein, the term "syntactic structure" refers to any linguistic classification that is applied to assign meaning to individual words or groups of words in the complex proper name within the context of a language. Using NLP techniques enables improved accuracy for speech recognition of partial names by providing syntactic structure to the words in the names in addition to direct content of the words themselves. For example, given the song name "Somewhere Over the Rainbow", the NLP produces a syntactic structure including the syntactic units:
a. Noun Phrase (NP): the rainbow
b. Prepositional Phrase (PP): over the rainbow
c. Adverbial Phrase (ADVP): somewhere The NLP processing can also include categories of syntactic units, such as verb phrase, adjective phrase and the like. The syntactic units represent the syntactic structure of the names, and are helpful in generating the meaningful and intuitive candidates of partial proper names which are likely to be spoken by the users.

For example, some users are more likely to keep the original noun phrases in the proper names, while omitting some adverbial phrase or prepositional phrase. So such information can be used to generate the candidates of partial names. The purpose of the presented framework is to improve the speech recognition on the partial proper names by incorporating the NLP technologies. This framework can be combined with any speech recognizer and used in any spoken dialog applications.

The system 100 includes four main components, the NLP module 104, the module for candidate generation of partial proper names 108, the speech recognition module 112 and the post processing module 116. The description of each module is as follows.

The NLP module 104 performs natural language processing on a corpus of full, complex proper names. When the full proper names are obtained from the public database or personal database (e.g. the music player that a user plugs into the system), these full names will first be processed by the NLP module. Compared to the short proper names such as a person name or city name, the complex proper names are usually long and have complicated internal syntactic structures, such as a song name or a movie name. Consequently, the names are suitable for NLP techniques. The processing includes sub modules of Part-of-Speech (POS) tagging, shallow chunking, syntactic parsing or other necessary processing steps.

In the NLP, the specific tags in the results represent the different syntactic role of each word in the complex proper name. The NLP identifies the syntactic structure of the complex proper name and assigns syntactic type information to individual words or groups of words in the proper name. For example the NLP produces the following results, given the full song name: "Somewhere Over The Rainbow"
a. The result of POS tagging: Somewhere_RB Over_IN The_DT Rainbow_NN
b. The result of chunking: Somewhere_S-ADVP Over_S-PP The_B-NP Rainbow_E-NP
c. The result of parsing: (S1 (ADVP (ADVP Somewhere) (PP Over (NP The Rainbow))))

The output from the NLP module 104 includes the syntactic structural results of one or more NLP techniques to form the input to the candidate generation module 108. The candidate generation module 108 performs one or more machine learning techniques to identify candidate partial proper names that correspond to full proper names using the both structured syntactical elements from the NLP module 104 and the words in the complex proper name as input. The candidate generation module 108 uses an existing machine learning techniques to process the output results from the NLP module 104. Examples of machine learning techniques include Conditional Maximum Entropy (CME), Conditional Random Field (CRF), Hidden Markov Model (HMM), Neural Network, or their variants. The candidate generation module 108 uses the syntactic structural identifiers for the phrases (noun phrase, verb phrase, prepositional phrase, etc.), sub-clauses or parse tree from the NLP module in addition to using the actual words from the full proper name to generate the partial proper name candidates. For example, the term "rainbow" is a noun and "the rainbow" is a noun phrase in the example above from the NLP module 104, and the candidate generation module 108 applies the machine learning techniques to both the words "rainbow" and "the rainbow" and the syntactical structural types for these terms.

Figure 2:
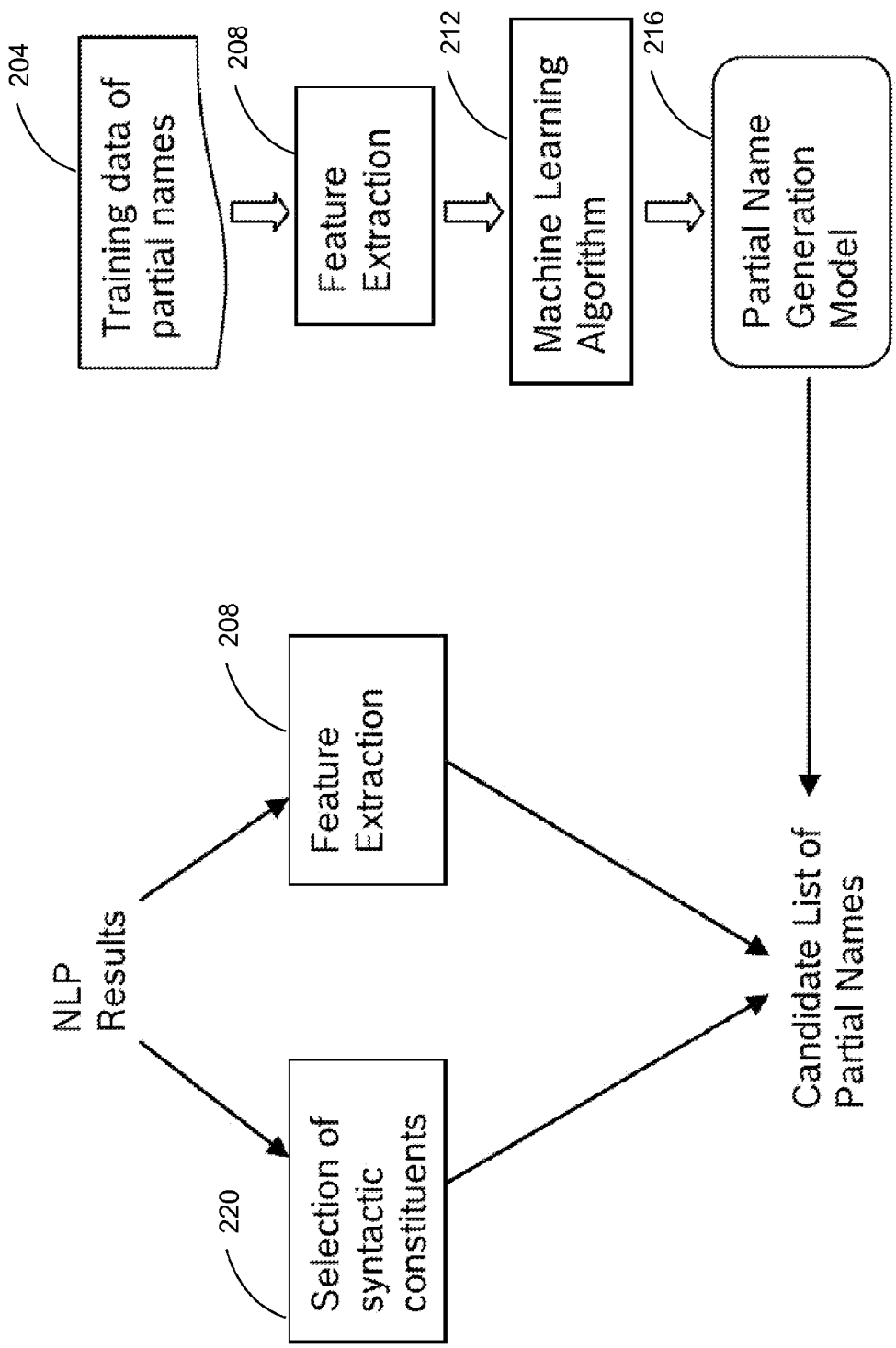
FIG. 2 is a diagram of a process for candidate partial name generation in the framework of FIG. 1.

The information about the syntactic structure of a complex proper name is used to generate the partial candidates in the partial proper name candidate generation module 108. FIG. 2 also depicts the operation of the partial proper name candidate generation module in more detail. As depicted in FIG. 2, the processing includes feature extraction 208 from a corpus of complex proper names 204, machine learning 212, and a partial name generation model 216. As depicted in FIG. 2, the candidate generation process also includes selection of syntactic constituents 220 from the NLP results. For each full name, the constituents extracted in the previous step will be used to generate a candidate list of partial names. There are various solutions we can take here. Each phrase could be a potential partial name. Based on the type of the phrase, the framework selects the types of phrases to keep in the partial name, and leave out those less important phrases.

Once again using "Somewhere Over The Rainbow" as an example of complex proper name, if only the noun phrase (NP) is kept, then results include one candidate of partial name: NP: The Rainbow If all types of phrases are retained, the results include three candidates of partial names:
a. NP: The Rainbow
b. PP: Over The Rainbow
c. ADVP: Somewhere In some embodiments, the system 100 performs a training process to obtain more robust prediction of the partial names based on a set of speech input data of partial names that are collected from users of the system 100. Such data can be used as training data. Then the machine learning based approaches can be applied to learn the model of partial proper name generation, depending on the word features or syntactic features such as the types or occurrence of the syntactic constituents. The learning procedure can be regarded as a sequence labeling process, where each word in the original name is labeled to be kept in the partial name candidate or to be omitted from the partial name candidate.

The NLP processing and candidate generation can be executed offline using one or more network-connected servers for the existing public database of proper names. The servers optionally include additional computational processing power that exceeds the capabilities of mobile electronic devices, in-vehicle driver information systems, and other electronic devices that commonly serve as front-ends for speech interaction with a user. For those dynamic name lists from an individual user, the procedure can be executed online by the device for a more limited range of complex proper names.

After the candidate list of partial names is generated, the candidate list is sent to the transcription service in module 112. The transcription service in the speech recognizer 112 produces a corresponding phonetic transcription of each partial name and incorporates the partial name into the model for the speech recognizer 112 that is stored in the memory. The updated model for the speech recognizer 112 is used in subsequent speech recognition operations that receive speech input data including partial proper names to enable the speech recognizer 112 to identify complex proper names from the partial proper names. If a partial name candidate occurs in the user speech, the partial candidate name is recognized more accurately when the transcription has been integrated into the speech recognizer. The NLP processing module 104 in the system 100 improves the robustness of the results of the partial candidate name generation module 108 and the corresponding results of the speech recognizer 112.

Figure 3:
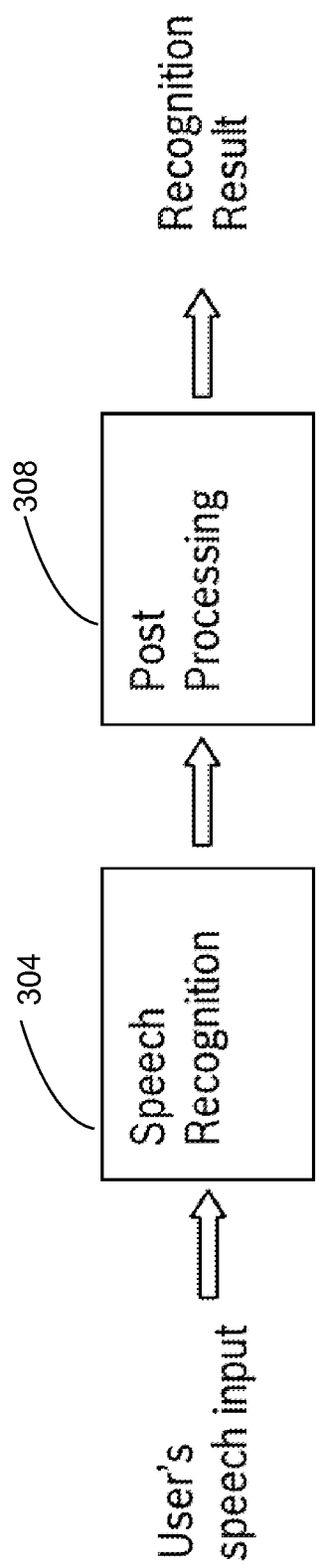
FIG. 3 is a diagram of a speech recognition and post-processing framework for recognition of partial proper names.

As depicted in FIG. 3, some embodiments of the framework include the speech recognition 304 followed by post-processing 308 after the speech recognition process identifies one of the candidate partial names. As a speech recognizer can usually generate several possible recognition results which are referred to as the n-best results. In order to obtain the most possible result from the n-best results, these n-best results can be post processed using some methods such as re-ranking or automatic error correction, based on the available context information. The list of proper names can also be used here for name correction. As a sequence, the performance of speech recognition can be further improved. In the system 100, the post-processor module 116 implements the post-processing functionality 308.

After post-processing the system 100 provides the single or n-best results from the post-processing module 116 as input to another software process. For example, a search facility in a media playback program receives the recognized result of "Somewhere Over the Rainbow" in response to the speech input that only includes the partial name "Over the Rainbow". The media playback program then identifies an audio or video file or online feed that corresponds to the full proper name for the song "Somewhere Over the Rainbow," and begins playback of the selected media file. In other configurations, the computing system performs another action in response to the identified proper name, such as searching for a proper name of a point of interest (POI) in an in-vehicle navigation application using the identified full proper name, and generating navigational route or other suitable output for the POI.

It will be appreciated that variants of the above-disclosed and other features and functions, or alternatives thereof, may be desirably combined into many other different systems, applications or methods. For example, while the foregoing embodiments are configured to use standard tokens corresponding to English words, various other languages are also suitable for use with the embodiments described herein. Various presently unforeseen or unanticipated alternatives, modifications, variations or improvements may be subsequently made by those skilled in the art that are also intended to be encompassed by the following claims.

What is claimed:

1. A method of speech recognition for partial proper names comprising:
    receiving, with a processor, a corpus including a plurality of complex proper names;
    performing, with the processor, natural language processing to generate a syntactic structure corresponding to a plurality of words in one of the plurality of complex proper names in the corpus;
    generating, with the processor, a plurality of candidate partial names corresponding to the one complex proper name using a machine learning process with reference to the syntactic structure corresponding to the one complex proper name and the plurality of words in the one complex proper name, wherein the one complex proper name is divided into categories of syntactic units and each of the plurality of candidate partial names comprises a subset of words from the plurality of words contained within the one complex proper name and the subset of words classified into a specific syntactic category;
    selecting, with the processor, only a portion of the plurality of candidate partial names based on at least one syntactic structural identifier of at least one phrase in each candidate partial name to provide a modified list of candidate partial names;

producing, with the processor, a phonetic transcription of each partial name in the modified list of candidate partial names;

incorporating, with the processor, the modified list of candidate partial names based on the phonetic transcription into a model for a speech recognizer to recognize partial names in a speech recognition process; and storing, with the processor, the model for the speech recognizer in a memory;

receiving, with the processor, speech input from a user comprising a candidate partial name from the modified candidate partial names;

performing, with the processor, speech recognition, using the model, on the received speech; and identifying, with the processor, the one complex proper name based on the recognized speech and performing an action on a user device based on the identified one complex proper name.

2. The method of claim 1, the natural language processing further comprising:
generating with the processor the syntactic structure using Part-of-Speech (POS) tagging.

3. The method of claim 1, the natural language processing further comprising:
generating with the processor the syntactic structure using shallow chunking.

4. The method of claim 1, the natural language processing further comprising:
generating with the processor the syntactic structure using syntactic parsing.

5. The method of claim 1, the machine learning process further comprising:
generating with the processor the plurality of partial proper name candidates using Conditional Maximum Entropy (CME).

6. The method of claim 1, the machine learning process further comprising:
generating with the processor the plurality of partial proper name candidates using a Conditional Random Field (CRF).

7. The method of claim 1, the machine learning process further comprising:
generating with the processor the plurality of partial proper name candidates using a Hidden Markov Model (HMM).

8. The method of claim 1, the machine learning process further comprising:
generating with the processor the plurality of partial proper name candidates using a neural network.

9. A speech recognition system comprising:
a memory configured to store:
a corpus including a plurality of complex proper names; and
a model for a speech recognizer; and
a processor operatively connected to the memory, the processor being configured to:
perform natural language processing to generate syntactic structure corresponding to a plurality of words in one of the plurality of complex proper names in the corpus;
generate a plurality of candidate partial names corresponding to the one complex proper name using a machine learning process with reference to the syntactic structure corresponding to the one complex proper name and the plurality of words in the one complex proper name, wherein the one complex proper name is divided into categories of syntactic units and each of the plurality of candidate partial names comprises a subset of words from the plurality of words contained within the one complex proper name and the subset of words classified into a specific syntactic category;
select only a portion of the plurality of candidate partial names based on at least one syntactic structural identifier of at least one phrase in each candidate partial name to provide a modified list of candidate partial names;
incorporate the modified list of candidate partial names based on the phonetic transcription into the model for the speech recognizer to recognize partial names in a speech recognition process;
store the model for the speech recognizer in the memory;
receive speech input from a user comprising a candidate partial name from the modified candidate partial names;
perform speech recognition, using the model, on the received speech; and
identify the one complex proper name based on the recognized speech and performing an action on a user device based on the identified one complex proper name.

10. The system of claim 9, the processor being further configured to:
perform the natural language processing to generate the syntactic structure using Part-of-Speech (POS) tagging.

11. The system of claim 9, the processor being further configured to:
perform the natural language processing to generate the syntactic structure using shallow chunking.

12. The system of claim 9, the processor being further configured to:
perform the natural language processing to generate the syntactic structure using syntactic parsing.

13. The system of claim 9, the processor being further configured to:
generate the plurality of partial proper name candidates using Conditional Maximum Entropy (CME).

14. The system of claim 9, the processor being further configured to:
generate the plurality of partial proper name candidates using a Conditional Random Field (CRF).

15. The system of claim 9, the processor being further configured to:
generate the plurality of partial proper name candidates using a Hidden Markov Model (HMM).

16. The system of claim 9, the processor being further configured to:
generate the plurality of partial proper name candidates using a neural network.

* * * * *